United States Patent [19]
Bell et al.

[11] Patent Number: 5,875,293
[45] Date of Patent: *Feb. 23, 1999

[54] SYSTEM LEVEL FUNCTIONAL TESTING THROUGH ONE OR MORE I/O PORTS OF AN ASSEMBLED COMPUTER SYSTEM

[75] Inventors: James S. Bell, Cedar Park; Franklin D. Tomlinson, Round Rock; Michael A. Wason, Austin, all of Tex.

[73] Assignee: Dell USA, L.P., Round Rock, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 512,617

[22] Filed: Aug. 8, 1995

[51] Int. Cl.$^6$ ........................................... G06F 11/00
[52] U.S. Cl. ..................... 395/183.03; 364/238.3
[58] Field of Search ..................... 395/429–430, 395/442, 833, 183.03, 183.04, 183.05, 651, 652, 311, 309, 182.06, 183.19, 183.22; 364/231, 231.1, 280.2, 238.1, 238.2, 238.3, 243.43; 711/102, 103, 115

[56] References Cited

U.S. PATENT DOCUMENTS

| | | | |
|---|---|---|---|
| 4,691,316 | 9/1987 | Phillips | 395/183.05 |
| 5,463,766 | 10/1995 | Schieve et al. | 395/652 |
| 5,471,674 | 11/1995 | Stewart et al. | 395/652 |

*Primary Examiner*—Robert W. Beausoliel, Jr.
*Assistant Examiner*—Nadeem Iqbal
*Attorney, Agent, or Firm*—Akin, Gump, Strauss, Hauer & Feld, L.L.P.

[57] ABSTRACT

A test apparatus and method for fully testing the functional aspects of a computer system at the system level through one or more of its I/O ports. A test system is connected to an externally available I/O port of the computer under test for accessing its system ROM and a jumper is installed on the computer under test to disable its system ROM. The jumper also bypasses the PCMCIA controller, if necessary, to provide the test system direct access to the I/O port and thus the system ROM. The computer under test is booted from diagnostic test code stored in memory of the test system, where the diagnostic test code has complete control and performs a series of tests on the computer under test. Other I/O ports of the computer under test, including its serial ports, parallel port, keyboard and mouse ports, video port and a docking port may also be connected to the test system, if desired. Certain portions of the diagnostic test code may be downloaded into video RAM of the computer under test and executed sequentially. Also, a communication protocol may be established between the host computer and the computer under test so that the host computer can control initiation and monitor status of each test routine.

36 Claims, 10 Drawing Sheets

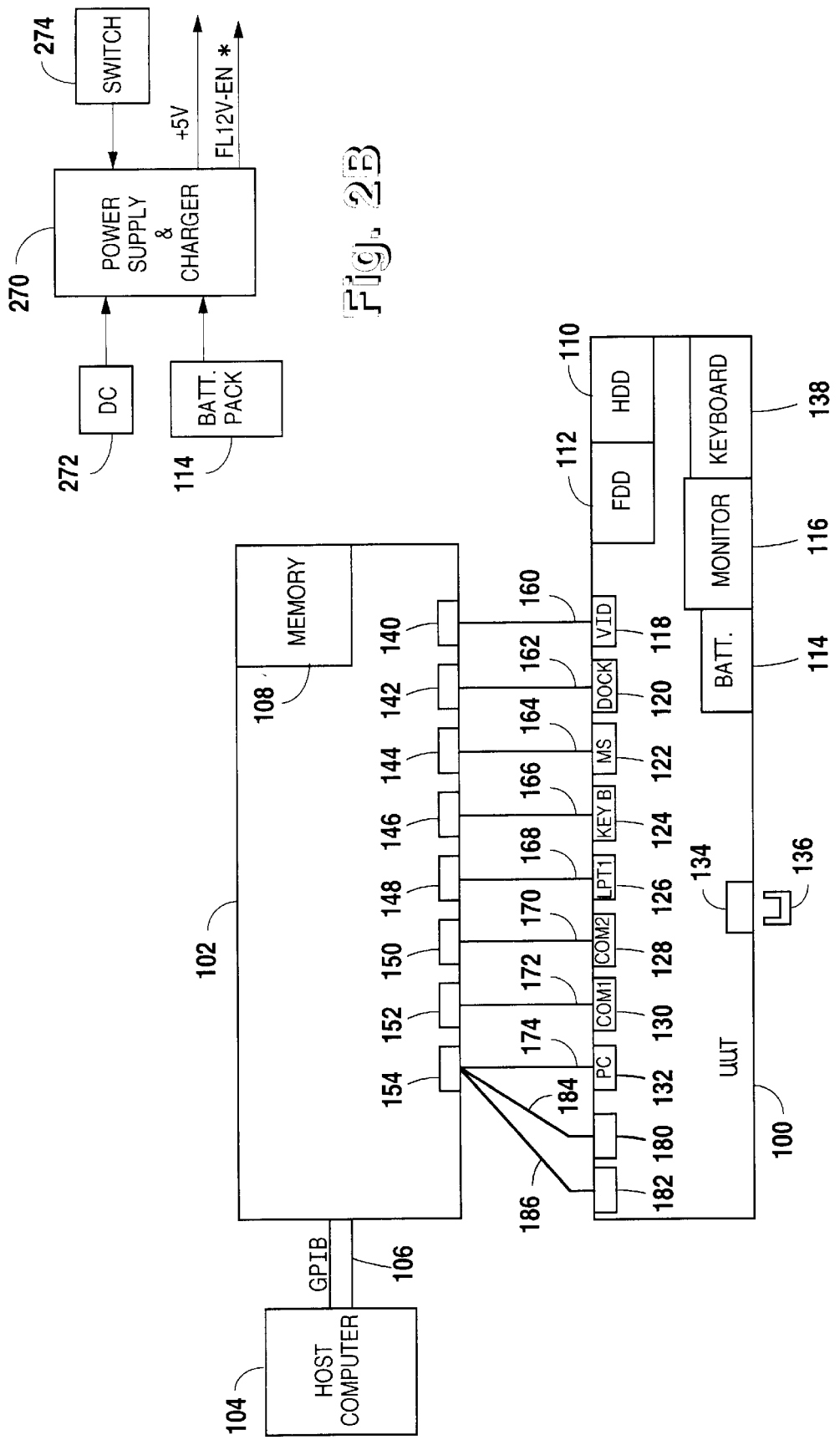

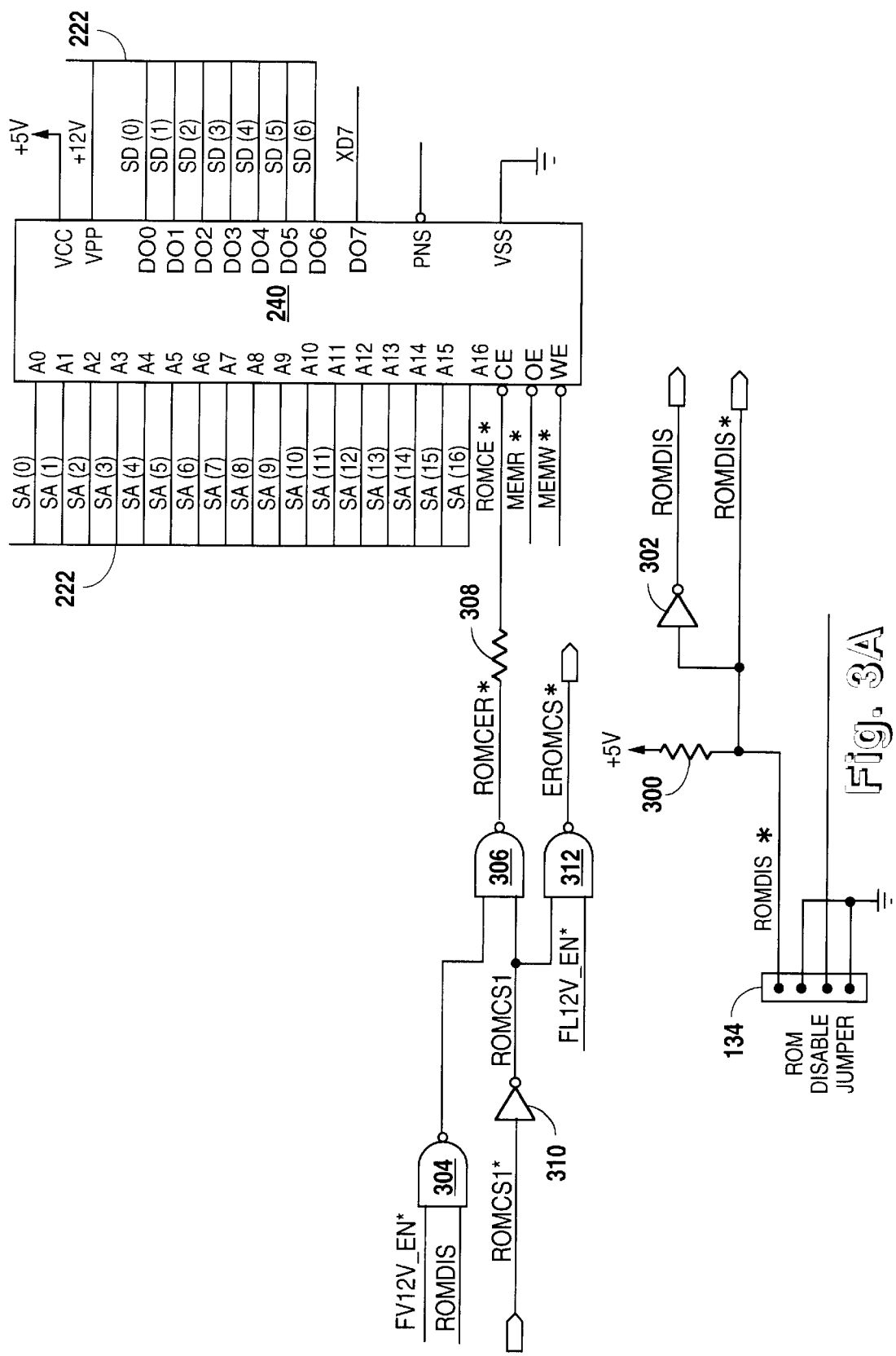

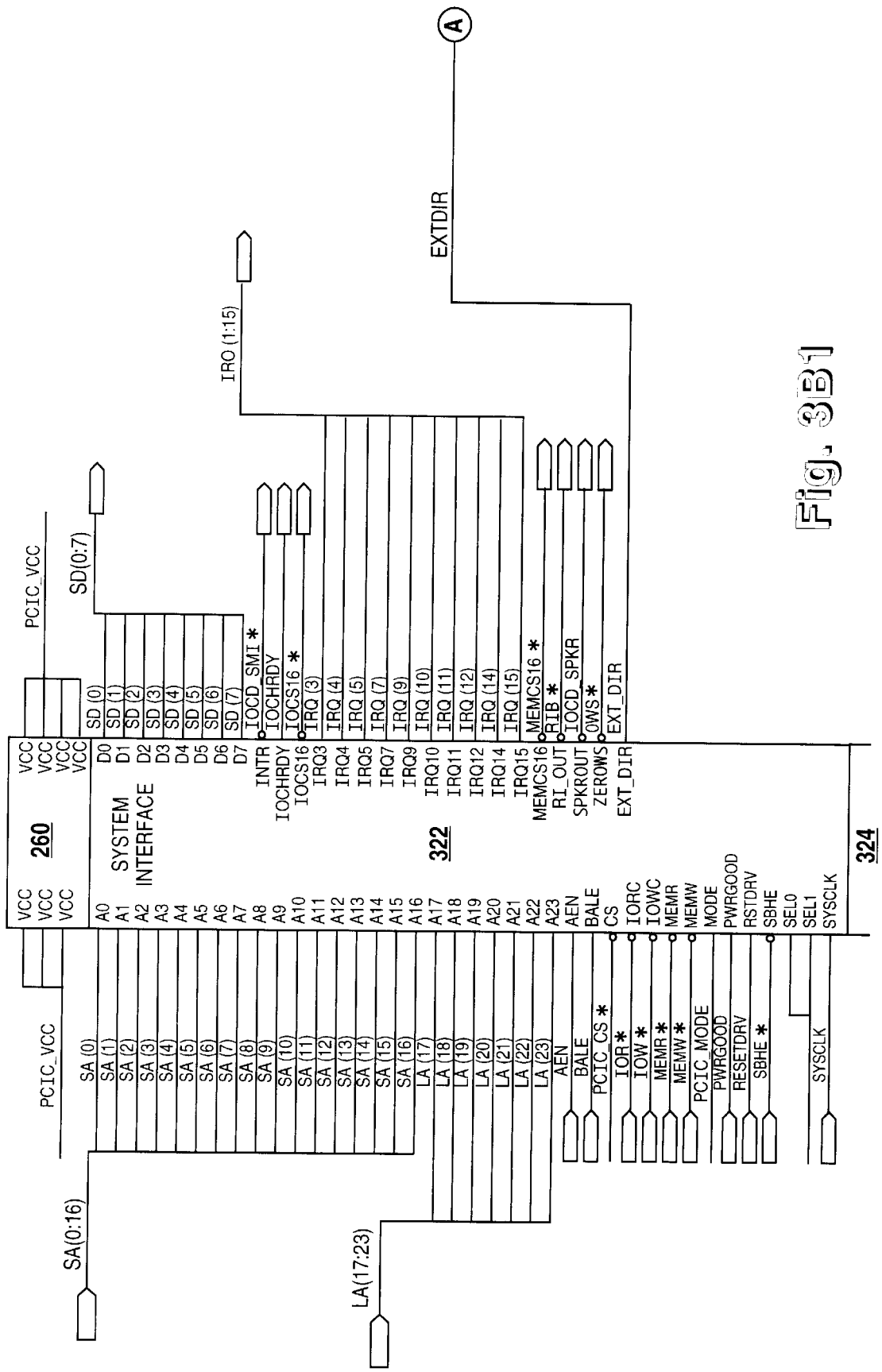
Fig. 3B1

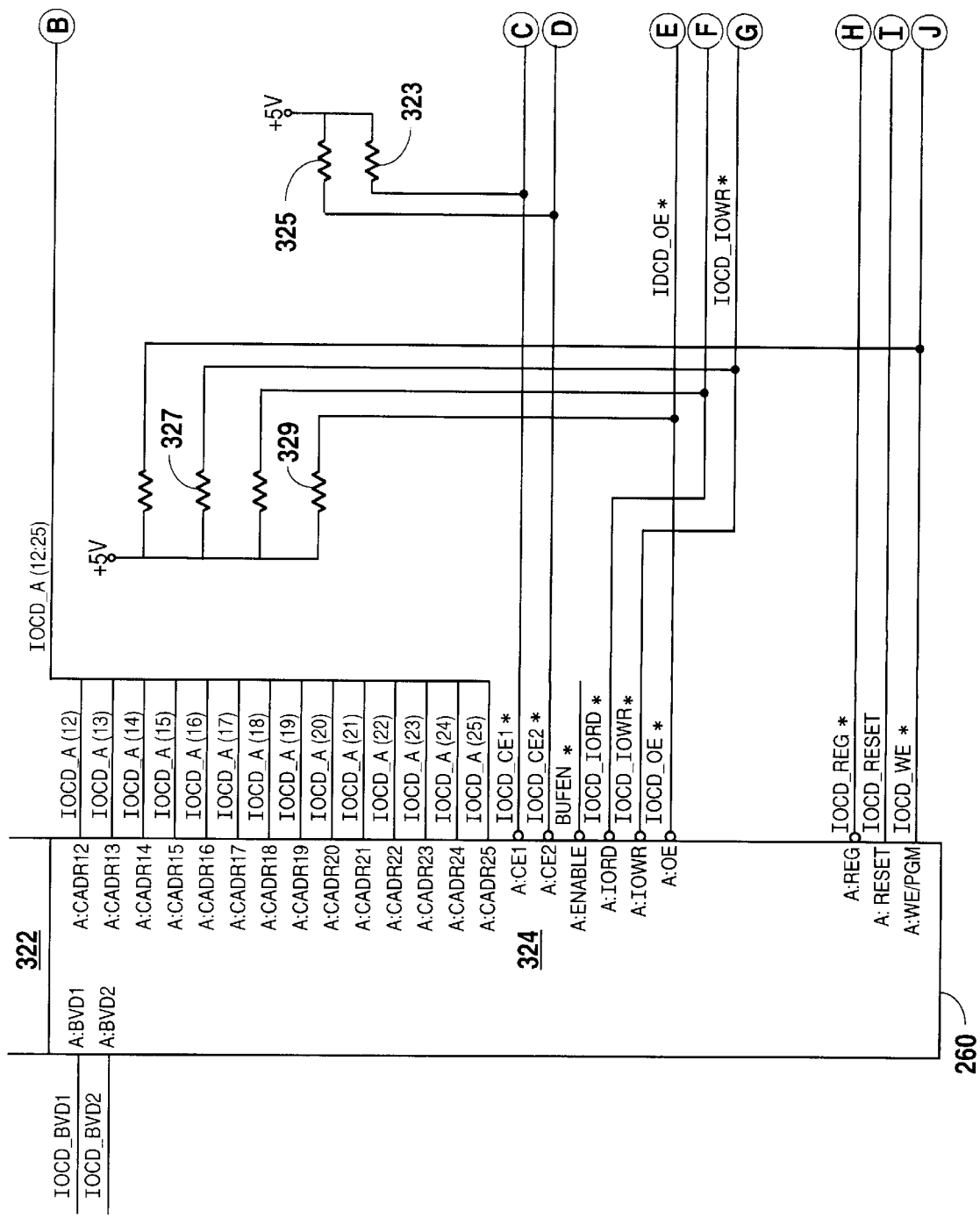
Fig. 3B2

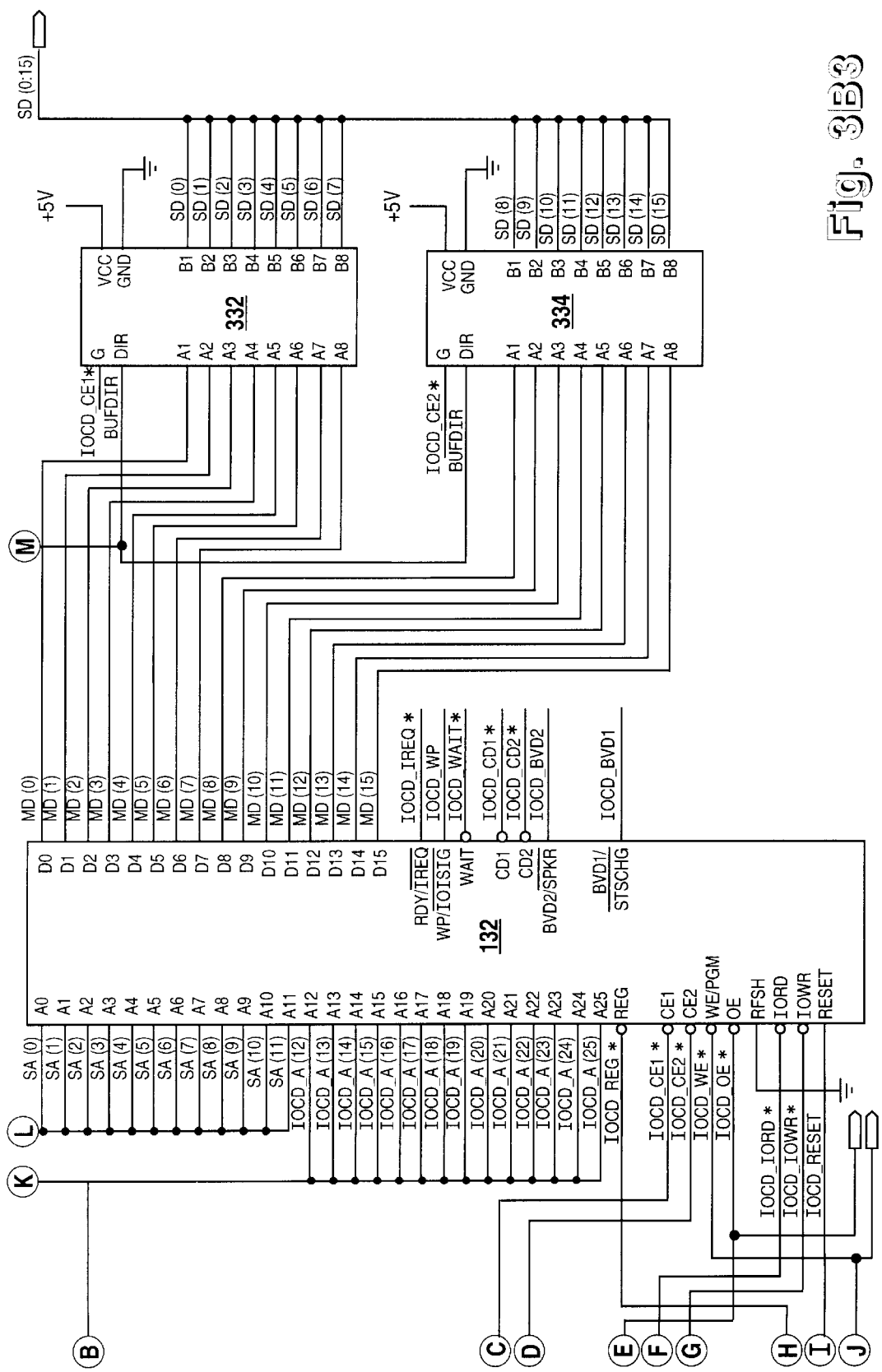
Fig. 3B3

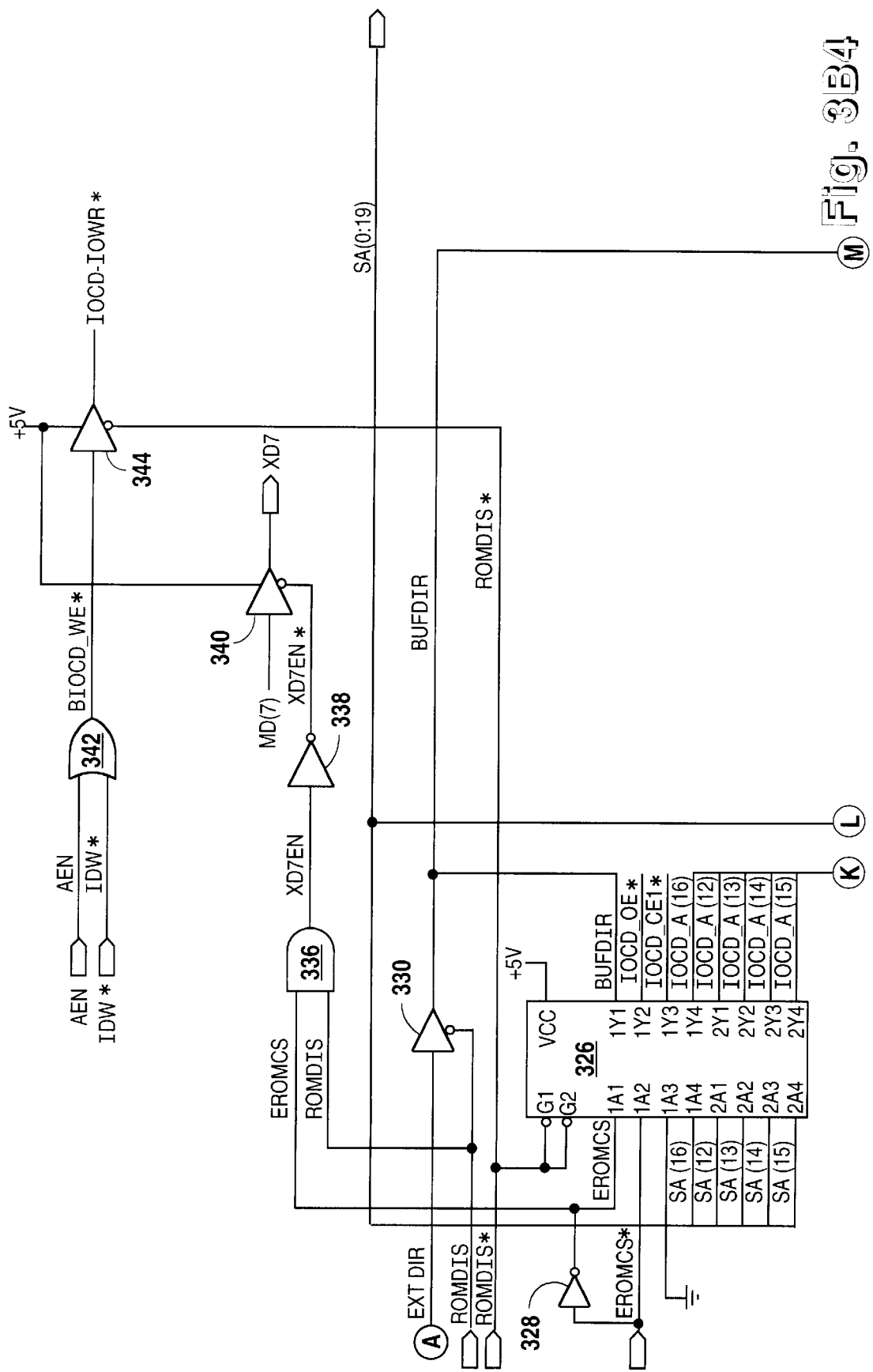
Fig. 3B4

SYSTEM LEVEL FUNCTIONAL TESTING THROUGH ONE OR MORE I/O PORTS OF AN ASSEMBLED COMPUTER SYSTEM

FIELD OF THE INVENTION

The present invention concerns testing computer systems, and more particularly to testing the functionality of a computer system at the system level through one or more of its I/O ports.

DESCRIPTION OF THE RELATED ART

Electronics devices, including computer systems, should be tested as much as feasible after manufacture and before shipping. It is often convenient to test individual components before the unit is assembled. The main system board, or motherboard, is the primary component to be tested and is typically placed on a bed of nails fixture and tested with complicated and expensive functional and in-circuit test equipment. The bed of nails fixture usually allows contact with every node of the motherboard. A unique fixture is required for system boards of different computer systems. Other components of the computer, such as the keyboard, mouse, monitor, hard drive, floppy drive, power supply, etc. are tested separately if desired.

There are several disadvantages to testing individual components as described above. First, if the computer is pulled off the shelf or is being returned for service, it must be disassembled to gain access to the components, which takes a significant amount of time. Second, problems related to component mismatch and open connector pins and cables may not be detected. Third, although bed of nails fixtures do provide fast and relatively thorough testing of the system board, such fixtures and the associated test equipment are very expensive and are not available at all repair locations. Also, a different test fixture is required for each type of computer system and for each type of tester. Such test fixtures are relatively expensive to manufacture. Furthermore, bed of nails testing only provides a limited amount of testing at the system level. Although the main system board is tested, the remaining I/O portions of the computer must be tested separately. Thus, not all of the I/O functions and peripherals are completely tested using the fixture method.

Some limited functional testing is performed by a basic input-output system (BIOS) routine executed by many computer systems upon power-up or reboot, which is a firmware routine stored in a system read-only memory (ROM). The BIOS typically first runs a power-up self-test (POST) routine, which is a series of diagnostic tests to ensure the basic hardware is operating properly. The BIOS also initializes basic hardware operations, such as communication with hard disk drives and floppy disk drives and the keyboard, and also initializes some basic video functions. The BIOS then searches for and initiates an operating system, such as Microsoft's Disk Operating System (MS-DOS) or IBM's PC-DOS.

The BIOS code does provide some I/O testing at the system level, but its diagnostic capability is limited. Only a very small amount of memory is available for diagnostic routines and error messages, which precludes extensive system-based diagnostics. If there is a hardware problem or a fatal error with the system, BIOS or DOS may fail, and the user consequently receives a fatal error message, or possibly no indication at all other than a blank screen. Any messages typically provided, however, only indicate that a problem exists, but rarely identify what the problem is or where it is.

Further, in order to boot a computer through BIOS and DOS, a substantial portion of the computer system must first be functional. Therefore, the computer must be partially functional before such routines are useful and may give the user a false sense of security that the system is fully functional. Also, it is not desirable to execute full diagnostic tests each time the computer is booted. Some computer systems include extensive diagnostic test routines for testing various portions of the system. However, these routines must be stored on the system itself in the form of a disk-based operating system and diagnostic programs which are often called by the BIOS or from DOS.

It is desirable, therefore, to provide a test apparatus and methodology to test the full functionality of a personal computer system at the system level without disassembling the computer.

SUMMARY OF THE INVENTION

A test apparatus and procedure according to the present invention provides full functional test of computer systems at the system level without having to disassemble the computer system. A test system is connected through at least one externally available I/O port of a computer system to be tested, which will be referred to as the UUT (unit under test). The system ROM of the UUT is disabled and the ROM space is coupled or otherwise re-directed to the I/O port. The test system includes memory with diagnostic code coupled to the I/O port connector, so that the processor of the UUT boots directly from the test system diagnostic code. In this manner, the test system has full control of the UUT and the UUT need only be minimally operational to initiate testing procedures.

In one embodiment, the UUT includes a separate test connector for coupling the test system to the system ROM signals thereby replacing the system ROM. In another embodiment, the test system is connected to an existing or standard I/O connector of the UUT. The UUT includes a jumper, switch or other mechanism to disable the system ROM of the UUT, so that the UUT boots from an external source through the I/O connector bus. The existing I/O connector is preferably coupled to the expansion bus of the UUT to allow access to the ROM signals, since the system ROM is typically accessible through the expansion bus. The UUT typically includes an expansion bus, such as the integrated system architecture (ISA) or the extended ISA (EISA) or any other type of expansion bus known to those having skill in the art. To access the expansion bus, an I/O card is plugged into an ISA or EISA expansion slot and the I/O bus signals are redirected to an externally available I/O connector provided on the I/O card. Alternatively, a PCMCIA (personal computer memory card international association) connector is provided, which is commonly provided on laptop and portable computers. If the I/O connector is the PCMCIA connector, the UUT further includes circuitry to bypass the PCMCIA controller, so that the ROM signals are accessed directly through the PCMCIA connector.

For more complete testing of the I/O connections, the test system is also connected to one or more of the remaining I/O ports of the UUT, such as one or more serial and parallel ports, the keyboard and mouse ports, the video port and a docking port, if present. These ports are thoroughly tested by passing signals or data between the UUT and the test system under full control of the diagnostic test code of the test system. This provides a more complete test than is typically performed in practice.

In one embodiment, the test routines remain in the test system and are executed by the UUT processor through the I/O connector. The UUT processor is instructed to sequentially execute a plurality of test routines to test most or all of the components and functional aspects of the UUT. A failure of any particular component or functional aspect is not fatal since the test system retains full control.

In an alternative embodiment, the video memory and/or the system memory is tested, and then test routines are transferred to the UUT memory for execution. Preferably, the diagnostics code downloads a test routine into the video random access memory (VRAM) of the UUT. All of the test routines are preferably compressed to save space and are decompressed when downloaded into the UUT. The video memory is preferably used since less problematic and more reliable than the system memory of typical personal computers. Also, use of the video memory to hold the test code allows full test of the system memory. A main test driver code is transferred to the video memory, and execution is transferred to the control of the driver code within the video memory. The main test code initializes the screen of the UUT and then enters a main loop for performing a series of other test routines to fully test the functional aspects of the UUT. During many of these test routines, test result and/or error code is generated and uploaded to the memory on the test system.

In the preferred embodiment, a host computer is coupled to or otherwise included in the test system for sending and receiving commands to initiate each of the test routines, as well as for monitoring the test result code stored in the memory of the test system. In this manner, the host computer controls almost all aspects of the tests being performed, and monitors the results of the tests to determine whether the test has been successful or not. The test system memory is dual ported so that the host computer can access the test result code while each test routine is being performed. In this manner, an operator can retrieve the status of each of the test's routines while being performed without interrupting the test routines. In more sophisticated embodiments, a communication channel is preferably established through a serial port, so that the host computer controls the test procedure to initiate, terminate and monitor each test and test result. A message is sent indicating that all desired tests have been performed and completed.

It is appreciated that a test procedure and apparatus according to the present invention provides a full functional test of each of the components of a computer system without disassembling the computer. The tests are executed by external code through a standard I/O connector, such as the PCMCIA connector, to access the system ROM space.

BRIEF DESCRIPTION OF THE DRAWINGS

A better understanding of the present invention can be obtained when the following detailed description of the preferred embodiment is considered in conjunction with the following drawings, in which:

FIG. 1 is a simplified block diagram showing a test apparatus for testing a computer system according to the present invention;

FIGS. 2A and 2B are schematic block diagrams of the computer system of FIG. 1;

FIGS. 3A and 3B are schematic diagrams illustrating a circuit for disabling the system ROM and bypassing the PCMCIA controller of the computer system of FIG. 1;

DETAILED DESCRIPTION OF THE PREFERRED EMBODIMENT

Figure 2A:
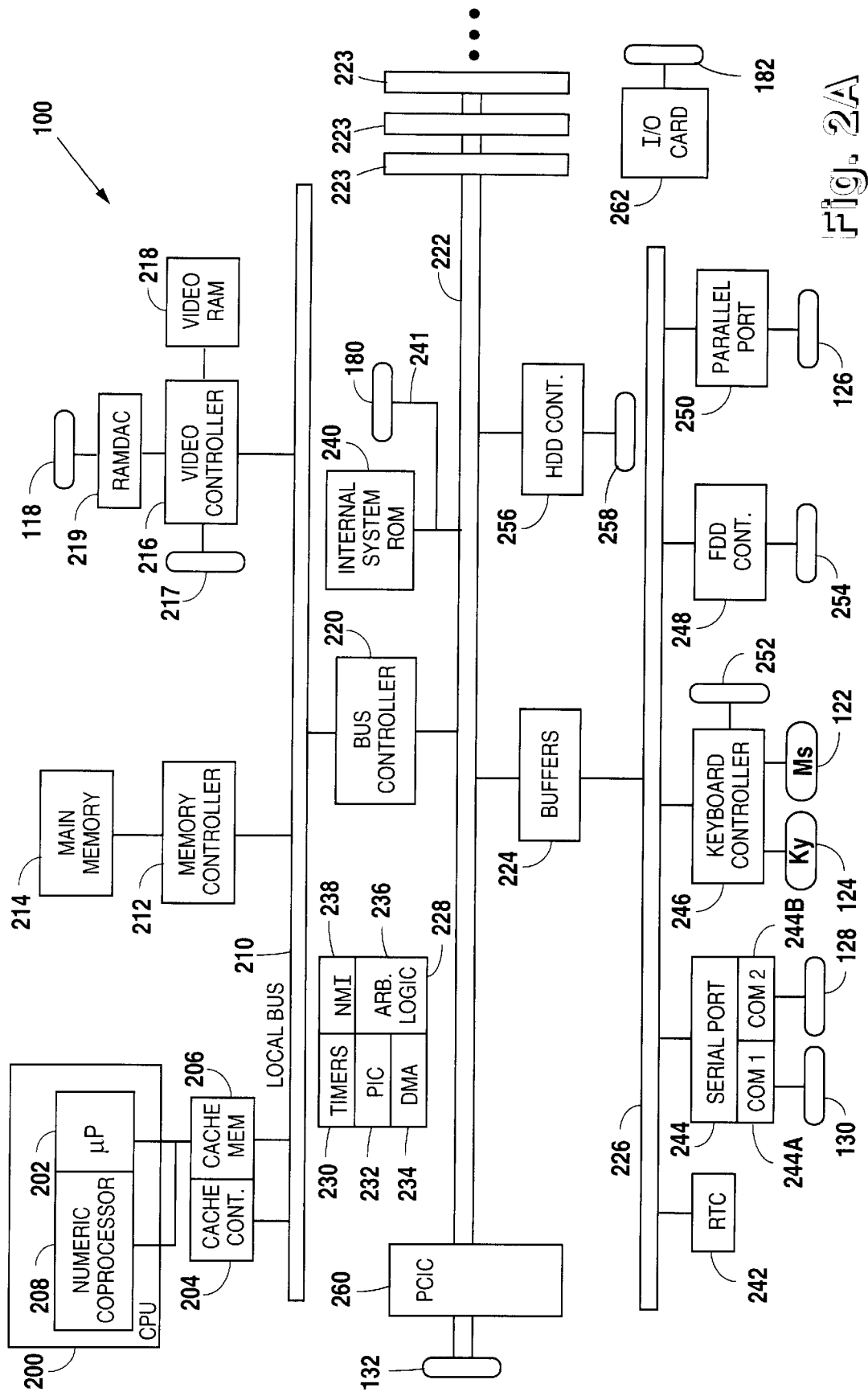

Referring now to FIG. 1, a simplified block diagram is shown illustrating test apparatus for testing a fully assembled computer system 100 through at least one of its input/output (I/O) ports according to the present invention. The computer system 100 may be any type of computer system, although an IBM or IBM-compatible personal computer including an 80386, i486 or Pentium processor by Intel is used for purposes of illustration. The present invention, however, is not limited to any particular type of computer system. The illustrated computer system 100 is either a desktop, laptop or portable computer, and will be referred to throughout this disclosure as the unit under test (UUT) 100.

The UUT 100 is connected to a test system 102 through at least one I/O port described below. The test system 102 includes memory 108, which is preferably dual ported static RAM (SRAM) for storing diagnostic test code and for execution by the UUT 100. The test system 102 is preferably connected to a host computer 104 through an I/O bus 106, which is preferably the IEEE 488 general purpose interface bus (GPIB). The host computer 104 preferably downloads the diagnostic code to the test system 102 for fully testing the functionality of the UUT 100 and also oversees test operations. Although the UUT 100 is not connected directly to the host computer 104 but is instead connected through the test system 102, the test system 102 serves primarily as a communication and data interface to establish communication between the host computer 104 and the UUT 100. It is understood that a separate host computer is not necessary for purposes of the present invention but is provided for purposes of convenience and more flexible control.

The UUT 100 preferably has several I/O peripheral components connected during test operations so that these elements may be fully tested. For example, a hard disk drive (HDD) 110 and a floppy disk drive (FDD) 112 are preferably included in and connected to the fully assembled UUT 100. Furthermore, if the UUT 100 is a laptop or portable computer, it preferably includes a battery 114, an internal keyboard 138 and an internal monitor 116, such as an LCD (liquid crystal display). The test system 102 is connected to an I/O port connector 132 of the UUT 100 through a corresponding cable 174 to a corresponding connector 154 on the test system 102. The connector 132 is preferably a PCMCIA (personal computer memory card international association) connector for receiving compatible PC cards or the like. For purposes of this disclosure, the connector 132 will be referred to as the PCMCIA connector 132. Most, if not all, functional testing of the UUT 100 is performed through this single connection using the PCMCIA connector 132.

Alternatively, a separate test port connector 180 is provided externally for directly accessing the pins and signals of an internal system ROM 240 (FIG. 2A), and an appropriate cable 184 is connected between the test port connector 180 and the connector 154 of the test system 102. In yet another embodiment, external bus connector 182 is provided on a plug-in I/O card 262 connected to an expansion slot 223 for accessing the signals of an I/O bus 222 of the UUT 100. The I/O bus 222 is any one of several I/O or expansion buses known in the industry, such as the industry standard architecture (ISA) or extended ISA (EISA) buses, or the peripheral component interconnect (PCI) bus. In either case, the I/O bus 222 is chosen for accessing the pins and signals of the system ROM 240. Although three separate connectors 132, 180 and 182 are shown with corresponding cables 174, 184 and 186, respectively, it is understood that only one of these connections is necessary for accessing the signals of the system ROM 240.

In alternative embodiments, other I/O ports or connectors of the UUT 100 are coupled to the test system 102 for more complete testing of these ports, it being understood that these connections are optional to provide full test all the way to each respective connector. A video connector 118, a mouse connector 122, a keyboard connector 124, an LPT1 or parallel port connector 126 and COM1 and COM2 serial port connectors 130, 128 are connected to the test system 102 to corresponding connectors 140, 144, 146, 148, 152 and 150 through appropriate cables 160, 164, 166, 168, 172 and 170, respectively. Also if the UUT 100 includes a docking port, a docking port connector 120 is also connected to a corresponding connector 142 on the test system 102 through an appropriate cable 162.

The UUT 100 preferably includes an external jumper connector 134 for receiving a jumper 136 to disable the system ROM 240 and to bypass a PCMCIA controller, which is preferably a PCIC referred to by reference number 260. The diagnostic code is downloaded from the host computer 104 through the GPIB bus 106 and preferably into the memory 108 of the test system 102. The jumper 136 is placed into the jumper receptacle 134 and the UUT 100 is turned on or otherwise booted. As will be shown below, the UUT 100 includes a microprocessor 202 which boots from the diagnostic code within the memory 108 of the test system 102, rather than booting from its own internal system ROM 240. The PCMCIA connector 132, or alternatively the connectors 180 or 182, allow access to the pins and signals of the system ROM 240 thereby effectively replacing the system ROM 102 with the memory 108 of the test system 102.

Referring now to FIG. 2A, a more detailed block diagram is shown of the UUT 100. The particular computer system as the UUT 100 shown and described herein is for purposes of explanation, it being understood that the present invention may be used with any type of computer system and particular configuration thereof. A central processing unit (CPU) 200 includes a microprocessor 202, which is preferably the 80386, i486 or Pentium processor by Intel, although any similar type processor is contemplated. The microprocessor 202 is connected to a cache controller 204, which is further connected to cache memory 206. Further, the CPU 200 preferably includes or the microprocessor 202 is otherwise connected to a math coprocessor 208. Although the microprocessor 202 preferably includes an internal math coprocessor, such as provided in the i486 DX or Pentium microprocessor, a separate coprocessor is contemplated, such as, for example, an 80387 coprocessor for the 80386 microprocessor. The present invention is not limited to any particular coprocessor configuration. The CPU 200 is connected to a processor or local bus 210, which is further connected to a memory controller 212. The memory controller 212 is connected to main memory 214, which typically includes between 2 and 32 megabytes (MB) or more of dynamic RAM (DRAM, SRAM or other core memory device).

A video controller 216 is preferably connected to the local bus 210, and the video controller 216 is further connected to video RAM 218 and to a RAMDAC (RAM digital to analog converter) 219 for coupling to an external monitor (not shown) through the video connector 118. During normal operations, the RAMDAC 219 converts digital pixel data from the video RAM 218 to the analog signals required by the external monitor, which is typically a cathode ray tube (CRT) display, or the like. If the UUT 100 is a laptop or portable computer, a separate internal connector 217 is preferably provided to connect the internal monitor 116 to the video controller 216.

A bus controller 220 is connected between the local bus 210 and the I/O bus 222, which preferably includes control, address and data lines. The I/O bus 222 is preferably the ISA or EISA bus as described previously, although other I/O buses are contemplated, such as the PCI bus. The address lines preferably include address signals SA (0:19), latched address signals LA (17:23) and data signals SD (0:15). For purposes of this disclosure, parentheses () indicate a bus with multiple signals, the least significant listed first. A set of address and data buffers 224 are connected between the I/O bus 222 and an X-BUS 226 as known to those skilled in the art. An integrated system peripheral (ISP) 228 is connected to the I/O bus 222, where the ISP 228 preferably includes several timers 230, a programmable interrupt controller (PIC) 232, a direct memory access (DMA) controller 234, and other logic, such as arbitration logic 236 and non-maskable interrupt (NMI) logic 238 as known to those skilled in the art.

The system ROM 240 is also preferably coupled to the I/O bus 222, although in other configurations, it is connected to the X-BUS 226 or any other convenient bus of the UUT 100. The system ROM 240 preferably stores the BIOS and POST code executed by the microprocessor 202 upon power-up or reboot. The system ROM 240 thus contains the normal power-up routines for initializing and testing certain portions of the UUT 100 as known to those skilled in the art. However, the system ROM 240 is usually a relatively small memory device, such as a 128 Kbyte flash ROM, and thus has a relatively limited amount of memory space. Thus, only the most important test routines are provided within the system ROM 240, whereas more sophisticated diagnostics routines may be stored elsewhere. Thus, the system ROM 240 performs very limited diagnostic routines upon power up of the UUT 100. In any event, it is not desired that the system ROM 240 perform extensive diagnostic routines every time the UUT or computer system 100 is rebooted. If the PCMCIA connector 132 is not provided and other I/O connectors are not available, the external test port 180 is added and the pins and signals of the system ROM 240 are connected to the connector through ROM signals 241 added to the system.

A real time clock (RTC) 242, a dual serial port 244, a keyboard controller 246, a FDD controller 248 and a parallel port 250 are all preferably connected to the XBUS 226. The dual serial port 244 comprises a COM1 serial port 244a and a COM2 serial port 244b, which are connected to the COM1 and COM2 serial port connectors 130, 128, respectively. The keyboard controller 246 is connected to the keyboard connector 124 and the mouse connecter 122, and also includes a connector 252 for connecting internally to the internal keyboard 138, if present. The FDD controller 248 is connected to the FDD 112 through a connector 254. The parallel port 250 is connected to the LPT1 port connector 126.

The I/O bus 222 is connected to a HDD controller 256, which is preferably an integrated drive electronics (IDE) port, having a connector 258 which is further connected internally to the HDD 110. Also, the I/O bus 222 is preferably connected to the PCIC 260, which is further connected to the PCMCIA connector 132. Alternatively, if a PCMCIA slot is not included, such as for the case of a desktop computer system, one or more I/O slots 223 are provided for receiving the I/O card 262, which provides the I/O bus signals to the I/O connector 182 for externally accessing the I/O bus 222. The PCIC 260 provides several adapter functions for interfacing a PC card plugged into a PCMCIA slot with the I/O bus 222. For example, the PCIC 260 typically performs power switching, PC card detection, address translation, data buffering and control, transfer timing and control, interrupt steering, status reporting and several other functions. However, these functions are not necessary for purposes of testing according to the present invention, so that it is desirable to bypass the PCIC 260 and electrically couple the I/O bus 222 to the PCMCIA connector 132.

FIG. 2B shows the power portions of the UUT 100, which includes a power supply and controller 270 having a connector 272 for receiving direct current (DC) power from an AC adaptor (not shown). Furthermore, the battery pack 114 is connected to the power supply 270, which is further connected to switches 274 for providing miscellaneous power for other external devices, such as an external floppy disk drive and a mouse (not shown). Preferably, the power supply 270 includes a microcontroller, such as the 6805 by Motorola, for controlling power supply operations including charging operations for the battery pack 114.

Referring now to FIG. 3A, a schematic diagram is shown illustrating a jumper connection to disable the system ROM 240. One pin of the connector 134 is connected to ground and the other pin provides a signal ROMDIS*, which is provided to one side of a resistor 300. The other side of the resistor 300 is connected to a signal +5V, which is the +5 volt output of the power supply 270. The ROMDIS* signal is pulled to ground and thus asserted when the jumper 136 is installed into the jumper connector 134. An asterisk (*) at the end of a signal name denotes negative logic, where the signal is considered asserted when pulled low, or at a logic 0, and is negated when pulled high, or at logic 1. Otherwise, signals conform to positive logic and are considered asserted when high, or logic 1, and negated when low, or a logic 0. The ROMDIS* signal is provided to the input of an inverter 302 which has an output providing a signal ROMDIS. The ROMDIS signal is provided to one input of a two-input NAND gate 304, having its other input receiving a signal FL12V_EN*, which is asserted low when the UUT 100 is empowered and the power supply 270 indicates that the 12V power supply is within voltage specification. The output of the NAND gate 304 is provided to one input of a two-input NAND gate 306. The output of the NAND gate 306 provides a signal ROMCER* to one end of a resistor 308, having its other end connected to the inverted chip enable input of the system ROM 240. A signal ROMCS1* is provided to the input of an inverter 310, having its output providing a signal ROMCS1 which is provided to the other input of the NAND gate 306 and to one input of another two-input NAND gate 312. The other input of the NAND gate 312 receives the FL12V_EN* signal and the output of the NAND gate 312 provides a signal EROMCS*.

The system ROM 240 receives the SA(0:16) signals at its address inputs and has seven of its eight data inputs receiving the SD (0:6) signals from the I/O bus 222. A signal XD7 is provided to the eighth data input pin of the system ROM 240. During normal operation, when the jumper 136 is not installed, the ROMDIS* signal is negated low. When the microprocessor 202 is booted, it pulls the ROMCS1* signal low, thereby pulling the ROMCER* signal low and accessing the system ROM 240. However, when the jumper 136 is installed, the ROMDIS* is asserted high, so that the NAND gate 306 asserts the ROMCER* signal high, disabling the system ROM 240. The output of the NAND gate 312 asserts the EROMCS* signal low, to access an external memory device when the ROMCSI* signal is asserted low and the jumper 136 is installed, as will be described further below. It is understood that an external switch or other mechanism could also be used to disable the system ROM 240 rather than the jumper 136.

Referring now to FIG. 3B, a simplified schematic diagram is shown illustrating a circuit used to bypass the PCIC 260 to provide a direct interface between the system ROM 240 and the PCMCIA connector 132. Of course, this option would not be required if the external connectors 180 or 182 are provided in the alternative embodiments. Only certain signals relevant to the present invention are shown, while many other signals of this interface are not shown for purposes of simplicity. The PCIC 260 includes a system interface 322 connected to the SA (0:16) and LA (17:23) address signals as well as the SD (0:7) data signals of the I/O bus 222 and thus the system ROM 240. The PCIC 260 also includes a CARD A interface 324 which is connected to signals IOCD_A (12:25) which are also connected to corresponding pins on the PCMCIA connector 132. Also, the CARD A interface 324 is connected to two chip enable signals IOCD_CE1*, IOCD_CE2*, which are provided to the CE1 and CE2 enable pins of the PCMCIA connector 132, and which are pulled high through resistors 323, 325, respectively, to the +5V signal. Further, signals IOCD_IOWR* and IOCD_OE* are pulled up through pullup resistors 327,329, respectively to the +5V signal, and are also provided to the IOWR and OE inverted pins, respectively, of the PCMCIA connector 132. The lower SA (0:11) address signals are connected to the PCMCIA connector 132 and the upper SA (12:16) address signals are connected to five inputs of an 8-bit tri-state buffer 326, which is preferably a 244 type buffer. In particular, the SA (12:15) signals are connected to the 2A1, 2A2, 2A3 and 2A4 input signals, respectively, while the SA (16) signal is connected to the 1A4 input of the buffer 326. The corresponding output bits 2Y1–2Y4 and 1Y4 are connected to the IOCD_A (12:16) signals, respectively. The EROMCS* signal is provided to the 1A2 input of the buffer 326 and also to the input of an inverter 328, which has its output providing the EROMCS signal, which is connected to the 1A1 input of the buffer 326. The 1A3 input of the buffer 326 is grounded. The outputs 1Y1, 1Y2 and 1Y3 of the buffer 326 corresponding to its 1A1, 1A2 and 1A3 inputs are connected to BUFDIR, the IOCD_OE* and IOCD_CE1* signals, respectively. The ROMDIS* signal is connected to the G1 and G2 inverted select inputs of the buffer 326.

A directional signal EXTDIR from the system interface 322 of the PCIC 260 is provided to the input of a tri-state buffer 330 having its output connected to the BUFDIR signal, which is connected to the directional inputs of two 8-bit transceiver buffers 332 and 334, which are preferably 245 type transceivers. The ROMDIS signal is provided to the inverted enable input of the buffer 330. In this manner, when the jumper 136 is installed, the output of the buffer 330 is tri-stated, so that the BUFDIR signal follows the EROMCS signal as buffered through the buffer 326. The sixteen data bits MD (0:15) of the PCMCIA connector 132 are divided into two 8-bit sections and provided to the transceiver buffers 332 and 334. In particular, the lower eight MD (0:7) data signals of the PCMCIA connector 132 are connected to the corresponding A pins of the transceiver buffer 332, which receives the SD (0:7) data signals at its B pins. Likewise, the upper eight MD (8:15) data signals of the PCMCIA connector 132 are connected to the A pins of the transceiver buffer 334, which receives the SD (8:15) data signals at its B pins. The IOCD_CE1* signal is provided to the inverted enable input of the transceiver buffer 332.

The EROMCS and ROMDIS signals are provided to the two inputs of a two-input AND gate 336, which provides its output to the input of an inverter 338. The output of the inverter 338 is provided to the inverted enable input of a tri-state buffer 340, which receives the MD (7) signal at its input and provides the XD7 signal at its output. Signals AEN and IOW* are provided to the two inputs of a two-input OR gate 342, has its output connected to the input of a tri-statable buffer 344. The buffer 344 receives the ROMDIS* signal at its inverted enable input and provides the IOCD_IOWR* signal at its output.

It can thus be seen that when the jumper 136 is inserted into the jumper connector 134 pulling the ROMDIS* signal low, the buffer 326 is enabled so that the signals asserted at its A inputs are asserted on its corresponding Y outputs, which pulls the IOCD_CE1* signal low, thereby enabling the buffer 332. This further connects the SD (0:7) data signals from the I/O bus 222 to the corresponding data signals MD (0:7) of the PCMCIA connector 132. Note that since the upper bits SD (8:15) are not needed, the IOCD_CE2* signal is pulled high so that the transceiver buffer 334 is disabled. The EROMCS* signal is buffered through the buffer 326 to assert the IOCD_OE* signal to enable an external ROM connected to the PCMCIA connector 132. The BUFDIR signal is likewise asserted corresponding to the EROMCS signal to indicate the appropriate direction of the data signals. It can therefore be seen that the jumper 136 connected to an external jumper connector 134 disables the system ROM 240 of the UUT 100 and also bypasses the PCIC 260 by connecting the necessary signals through buffers 326 and 332.

Figure 4:
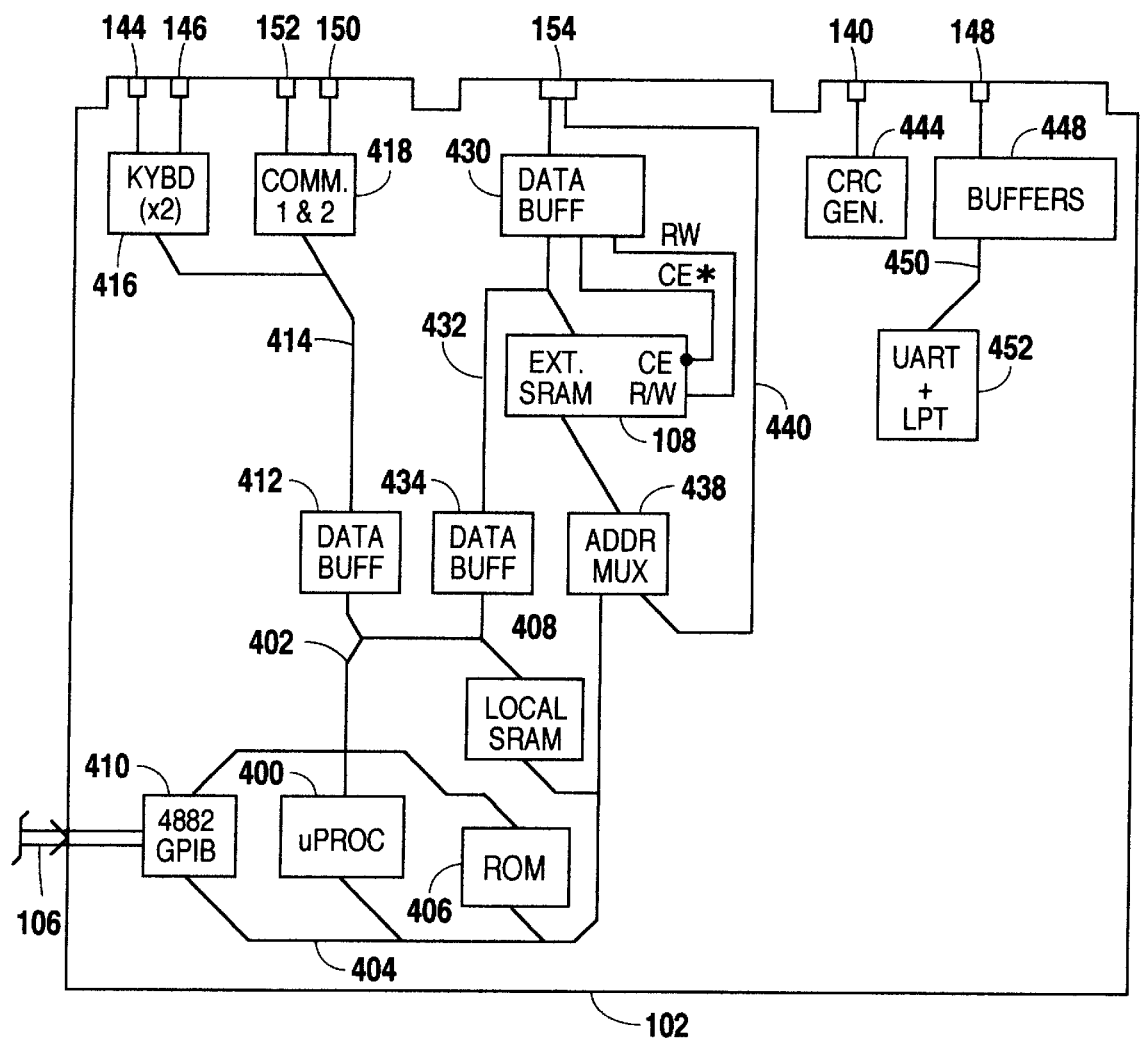
FIG. 4 is a block diagram of the test system of FIG. 1.

Referring now to FIG. 4, a simplified block diagram is shown of the test system 102. The test system 102 is preferably controlled by a microprocessor 400, which is preferably an 80C186 microprocessor manufactured by Intel. The microprocessor 400 includes a local data bus 402 and a local address bus 404, where both the data and address buses 402, 404 are connected to a local ROM 406 for storing initialization and boot code for the microprocessor 400. The data and address buses 402, 404 are also connected to a local SRAM 408 for storing code and data for the microprocessor 400. Furthermore, the data and address buses 402, 404 are connected to a GPIB interface 410 for connecting to the host computer 104 through the GPIB bus 106.

The data bus 402 is connected through a data buffer 412 to a data bus 414 for interfacing with a keyboard interface 416 and a dual serial communication interface 418. The keyboard interface 416 is coupled to the two external connectors 144 and 146 for connecting to the mouse connector 122 and keyboard connector 124, respectively, of the UUT 100 through the cables 164 and 166, respectively. The serial interface 418 is connected to the two serial connectors 152 and 150 for connecting to the COM1 serial connector 130 and the COM2 serial connector 128, respectively, of the UUT 100, through the cables 172 and 170, respectively. In this manner, the keyboard interface 416 interfaces with the keyboard controller 246, whereas the dual serial interface 418 communicates with the dual serial port controllers 244 of the UUT 100.

The connector 154 of the test system 102 has a data portion connected through a data buffer 430 to a data bus 432. Although not explicitly show, the IOCD_OE*, IOCD_CE1* and IOCD_IOWR* signals are provided through the PCMCIA connector 132 and to the connector 154. Of course, similar signals are provided on the I/O bus 222 or the ROM signals 241 if either the connectors 182 or 180 are used in the alternative embodiments. The data bus 432 is connected through a data buffer 434 to the local data bus 402. The data bus 432 is also connected to the memory 108, which is preferably a dual ported SRAM for containing the diagnostic test code according to the present invention. The memory 108 includes address signals which are connected to an address multiplexer 438, which is further connected to the local bus 404 and to address signals 440 from the connector 154. The IOCD_CE1* signal is buffered through the data buffer 430 to provide a signal CE*, which is provided to the inverted chip enable input of the memory 108. Also, the IOCD_IOWR* signal is buffered through the data buffer 430 to provide a signal RW, which is provided to the R/W input of the memory 108. The connector 140 of the test system 102, which is connected to the video connector 118, is connected to hardware CRC generators 444, which are used to collect video signatures of the video controller 216. The connector 148 of the test system 102, which is connected to the LPT1 connector 126 of the UUT 100, is further connected through buffers 448 to a bus 450, which is connected to a parallel port tester interface 452. The LPT1 tester 452 preferably includes a Centronics compatible printer port for interfacing with an external printer or printer port.

The test system 102 will not be described in detail, since a detailed description is not necessary for purposes of the present disclosure. In general, the test system 102 provides a communication and data interface between the host computer 104 and the UUT 100. In particular, the host computer 104 downloads the diagnostic test code through the GPIB bus 106, which the microprocessor 400 places into the memory 108. When the jumper 136 is installed into the jumper connector 134, the system ROM 240 is disabled and the PCIC 260 is bypassed and the system ROM signals, otherwise referred to as the system ROM space, is replaced by the memory 108. Thus, the microprocessor 202 begins execution from the diagnostic test code in the memory 108 when the UUT 100 is rebooted. In this manner, the test system 102 has complete control of the UUT 100 from initial startup. Further I/O connections between the test system 102 and the UUT 100 are optional. In the preferred embodiment, the test system 102 communicates with the UUT 100 through the COM1 serial port 244a through the serial interface 418. In this manner, two-way communication between the UUT 100 and the host computer 104 is provided through the test system 102.

Figure 5:
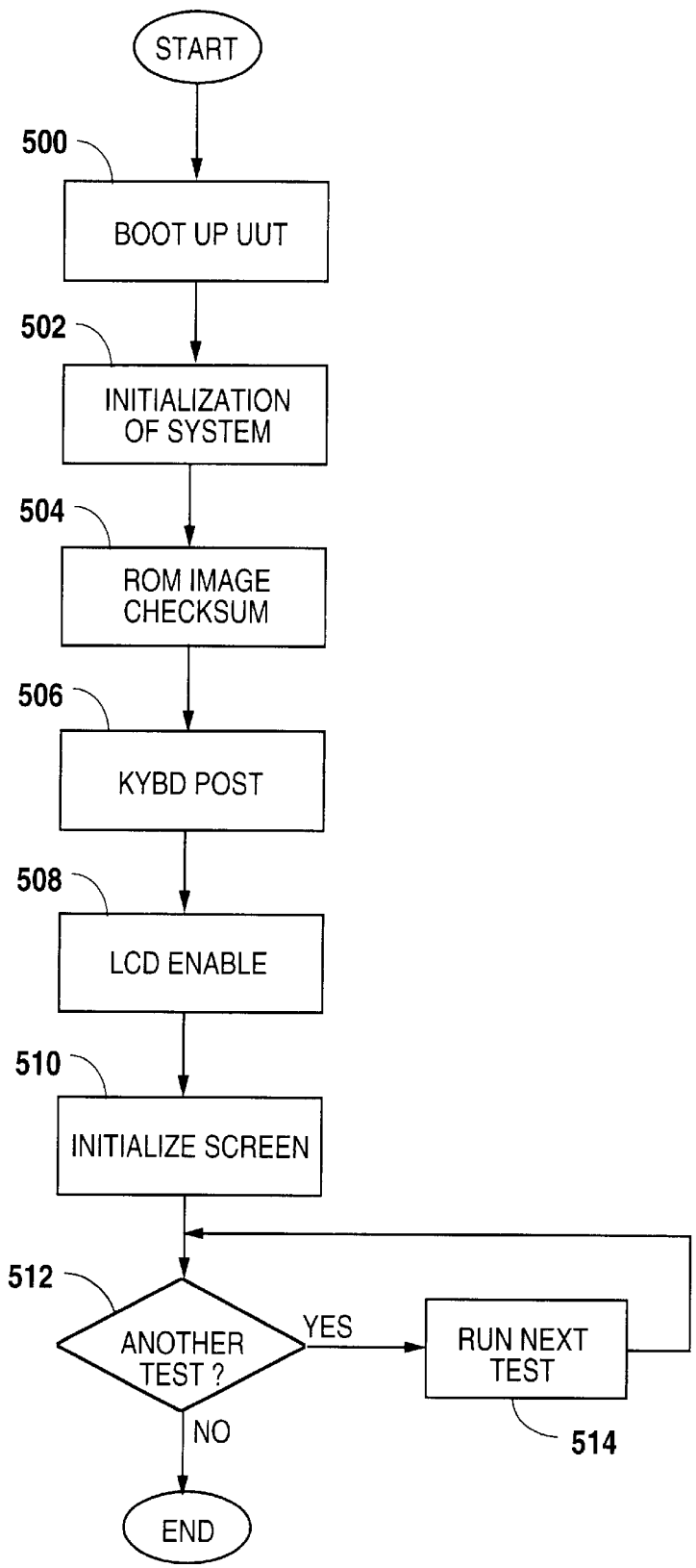
FIG. 5 is a flowchart diagram illustrating a test procedure for testing the computer system as controlled by the test system of FIG. 1.

Referring now to FIG. 5, a flowchart diagram is shown illustrating operation of one embodiment of a test procedure according to the present invention. It is understood that the diagnostic test code may take any one of many different forms for performing any number of functional tests of the UUT 100. After the host computer 104 and test system 102 are powered up, the diagnostic code is downloaded to the test system 102 and loaded into the memory 108. The jumper 136 is installed into the jumper connector 134 and the UUT 100 is powered up or otherwise booted as indicated by a step 500. The diagnostic code preferably comprises several source files executed sequentially, where the source files are preferably written in assembly language for direct execution by the microprocessor 202 of the UUT 100. Since the jumper 136 is installed, the system ROM 240 is disabled and the PCIC 260 is bypassed, so that the I/O bus 222 and the system ROM 240 space are directly connected to the PCMCIA connector 132.

From step 500, the microprocessor 202 proceeds to step 502 to perform some preliminary initialization of the UUT 100. Operation then proceeds to step 504, where the ROM image of the diagnostics code stored in the memory 108 is checksummed to determine whether it is correct. Operation then proceeds to step 506, where a keyboard initialization code portion of the diagnostic test code is executed to perform a keyboard power on self test (POST), which tests all keyboard, mouse and related power management functions of the UUT 100. After keyboard POST is completed, LCD power planes within the video controller 216 are then enabled in step 508.

Operation then proceeds to step 510 where the internal monitor 116 of the UUT 100 is initialized and the main loop of the diagnostic test code is entered as indicated by steps 512 and 514. The following Table I indicates many of the tests to be performed during the main loop, preferably in a sequential manner. However, no particular order of these tests need be followed and any of the tests may be omitted or other tests not listed may be performed as desired.

TABLE I

List of Tests Performed to Test the UUT

Video Subsystem Test
Keyboard MATS Memory Test
Keyboard Dataline Memory Test
Keyboard CPU Reset Test
Keyboard E2PROM Test
External Keyboard/Mouse Lines Test
Keyboard Internal Key Scan and LED's Test
Keyboard Controller <-> Power Supply Communication Test
Power Supply <-> Battery Pack Communication Test
Lid Switch Test
Diagnostic Switch Test
Power LED's Test
Power Planes Test
Register Tests
Programmable Interrupt Controller (PIC) Test
Programmable Interval Timer Test
RTC vs. Timer Test
RTC Test
Floating Point Unit Test
Serial Port Test
Parallel Port Test
RGB/Sync Line Test
Flat Panel Modes Test
Docking Port Test
Primary Cache Tags Test
Primary Cache SRAM
Primary Cache Cacheability Test
Primary Cache Locking Test
RAM Configuration
Address/Bit-Coupling Memory Test
Dataline Memory Test
Burst Transfer Memory Test
Misaligned DWORD Memory Test
Misaligned Burst Transfer Memory Test
Page Miss Memory Test
Random Cycle Memory Test
Diskette Drive Controller Test
Diskette Drive Boot Sector Test
Diskette Drive Write/Read Test
Diskette Drive Change Line/Write Protect Test
Diskette Drive Access LED
Hard Disk Drive Controller Test
Hard Disk Drive Boot Sector Test
Hard Disk Access LED
BIOS Flash Utility Each of the desired tests are performed in step 514 and then operation loops to step 512 to determine if another test is to be performed. When all tests have been executed, operation terminates.

Figure 6:
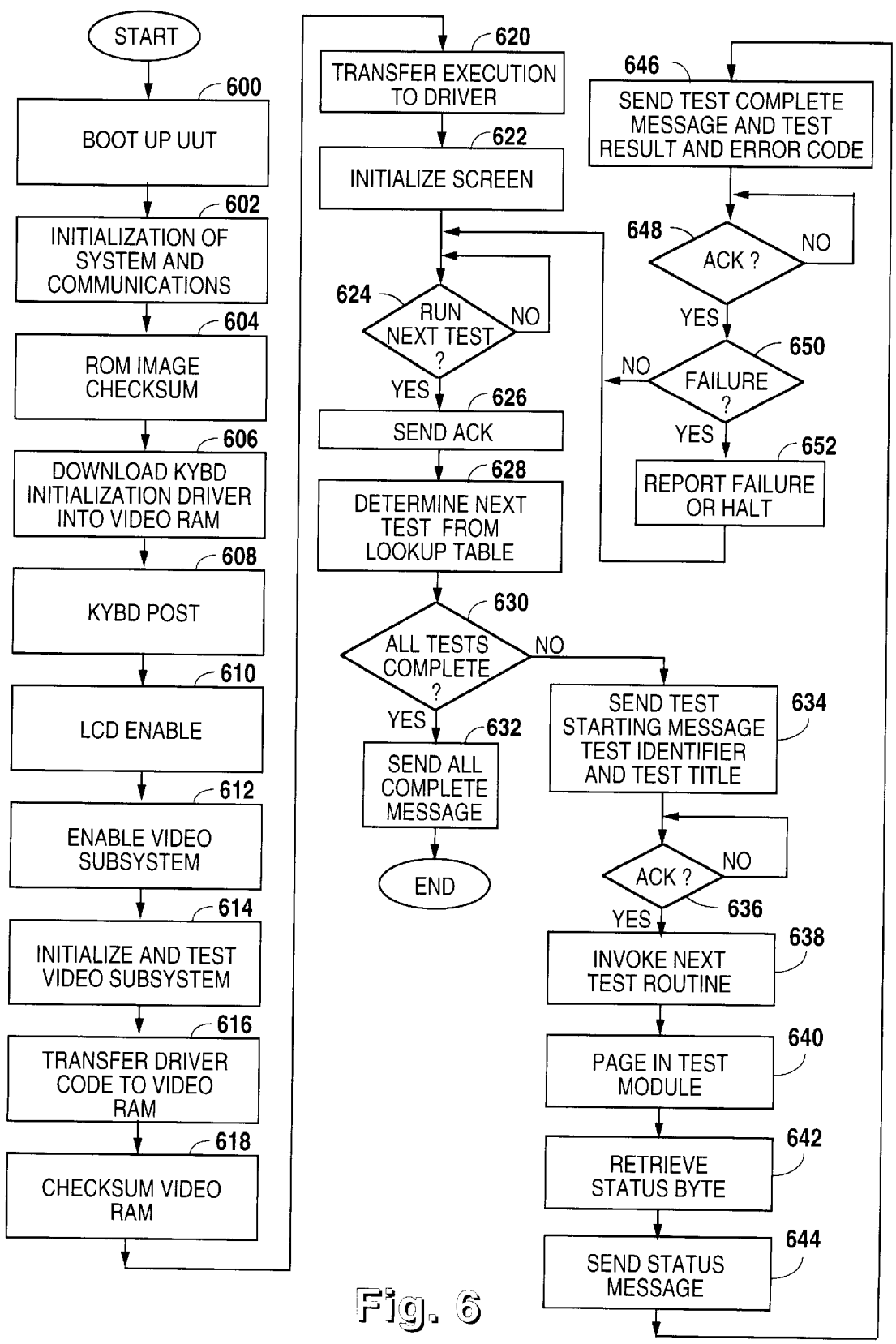
FIG. 6 is a flowchart diagram illustrating operation of an alternative test procedure including handshaking communication between the host computer and the computer system of FIG. 1.

Referring now to FIG. 6, a flowchart diagram is shown illustrating operation of another embodiment of a test procedure according to the present invention. In this embodiment a portion of the diagnostic, test code is downloaded to the video memory of the UUT 100 for execution. After the host computer 104 is powered up, the diagnostic code is downloaded to the test system 102 and loaded into the memory 108. The jumper 136 is installed into the jumper connector 134 and the UUT 100 is powered up or otherwise rebooted as indicated by a step 600. Steps 600–604 are essentially identical to steps 500–504 described above, except that communication between the test system 102, the host computer 104 and the UUT 100 are established in step 602. The protocol of these communications will be further described below.

Operation then proceeds to step 606, where the keyboard initialization code portion of the diagnostic code is downloaded into the video RAM 218 of the UUT 100. It is noted that the diagnostic code for keyboard initialization and for several test routines is preferably compressed for purposes of efficiency while loaded into the memory 108. Therefore, when portions of code are downloaded from the memory 108 to the video RAM 218 of the UUT 100, it is typically decompressed and then checksummed to verify that the transfer has completed properly. The video RAM 218 is used rather than main memory 214, since the video RAM 218 is more reliable and allows for a full test of the main memory 214. It is noted that the keyboard controller 246 preferably includes an embedded controller, such as the 80C51 by Intel. It is noted however, that the bus controller 220 must be at least marginally functional in order to boot, since the microprocessor 202 must access the I/O bus 222. Also, the video controller 216 must also be marginally functional. Once the keyboard initialization code is downloaded into the video RAM 218, it is executed to perform the keyboard power on self test (POST) in step 608, which tests all keyboard, mouse and related power management functions. After keyboard POST is completed, the LCD power planes within the video controller 216 are enabled in step 610.

Operation then proceeds to step 612 where the video subsystem of the video controller 260 is enabled. Operation proceeds to step 614, where the video controller 216, the RAMDAC 219 and the video RAM 218 are initialized and tested so that the video RAM 218 can be used as code and data space. This step preferably loads character fonts and leaves the video controller 216 initialized into the text mode with the internal monitor 116 enabled for displaying status messages. Operation then proceeds to step 616 where the main test driver code is decompressed from the memory 108 through the PCMCIA connector 132 and into the video RAM 218. The main test driver code also preferably includes associated utilities and communications code. The driver code loops through a table of test routines at the direction of the host computer 104 and communicates test result and error codes back to the test system 102, which stores the test result and error codes into the memory 108. The host computer 104 then communicates to the test system 102 to retrieve the test result and error codes of the test routines. The driver code also includes code paging and decompression utilities that are used to dynamically page code sections from the memory 108 into the video RAM 218 for each of the test procedures to be performed. Operation proceeds to step 618, where the driver code in the video RAM 218 is checksummed in a similar manner as described previously to ensure that the code is correct. Operation then proceeds to step 620, where control is transferred to the driver code in the video RAM 218. The driver code initializes the internal monitor 116 in step 622 and performs further system initialization and then enters the main loop indicated by step 624.

The main loop establishes a handshaking protocol between the host computer 104 and the UUT 100 through the test system 102 to execute each of the tests sequentially, when the tests were listed previously in Table I. The following table II indicates the basic protocol between the UUT 100 and the host computer 104:

TABLE II

Communication Protocol between the UUT and the Host Computer

| UUT | Host Computer |
|---|---|
| Wait for "RUN NEXT TEST" message. | |
| | Send "RUN NEXT TEST" message. |
| Receive "RUN NEXT TEST" message and look up next test. | |
| | Wait for "ACKNOWLEDGE" message. |
| Send "ACKNOWLEDGE" message. | |
| | Receive "ACKNOWLEDGE" and verify bytesum. |
| Send "TEST STARTING" message with Test ID and title if more tests, or send "ALL COMPLETE" if test list is completed. | |
| | Receive "TEST STARTING" message or "ALL COMPLETE" message. |
| Wait for "ACKNOWLEDGE". | |
| | Send "ACKNOWLEDGE" message. |
| Receive "ACKNOWLEDGE" message. | |
| | Wait for "TEST COMPLETE" message (with time-out) if "TEST STARTING" message was received (above), or end if "ALL COMPLETE" message was received (above). |
| Run test. | |
| Send "TEST COMPLETE" message with test result and error code, if generated. | |
| | Receive "TEST COMPLETE" message. |
| Wait for "ACKNOWLEDGE" message. | |
| | Send "ACKNOWLEDGE" message. |
| Receive "ACKNOWLEDGE" message. Wait for "RUN NEXT TEST" message if previous test was successful, or halt if previous test failed. | |
| | Send "RUN NEXT TEST" message if previous test was successful or end if previous test failed. |

In general, the host computer 104 sends a RUN NEXT TEST message through the COM1 serial port 244a to initiate each and every test to be performed. Upon receiving the RUN NEXT TEST message in step 624, the UUT 100 sends an ACKNOWLEDGE message in step 626 and then looks up the next test routine to be performed in step 628. If there are no more test routines to be performed in a step 630, the UUT 100 sends an ALL COMPLETE message indicating that the testing has been completed in step 632, and operation is halted. However, if another test routine is to be executed as determined in steps 628 and 630, operation proceeds to step 634 where the UUT 100 sends a TEST STARTING message with a test identification and the title of the test routine. Operation then proceeds to step 636, where the UUT 100 waits for an ACKNOWLEDGE message from the host computer 104. Upon receiving an ACKNOWL-EDGE signal from the host computer 104, the UUT 100 then invokes the next test routine in step 638 and proceeds to page in the next test routine module in step 640, if necessary. The main test driver code preferably displays a test title on the screen of the internal monitor 116, if any, indicating that the test is running as well as any status messages received from each of the individual test routines. In particular, the driver code retrieves a status byte, which is preferably either a pass/fail or other status indicator in step 642 from the test routine being executed. Then, the driver code either displays the status information on the internal monitor 116 and/or sends status information to the host computer 104 in step 644.

Operation proceeds to step 646 from step 644, where the UUT 100 sends a TEST COMPLETE message and also uploads test result and test error code, if any, to the test system 102, which stores the result code into the memory 108. Operation proceeds to step 648, where the UUT 100 again waits for an ACKNOWLEDGE message from the host computer 104 before proceeding. During this time, the host computer 104 retrieves the test and error result code to determine the results of the test. It is noted, however, that during some routines, test result code may be generated and uploaded to the test system 102 before the test routine is completed. Since the memory 108 is preferably dual ported SRAM, the host computer 104 can retrieve data from the memory 108 at any time, even while data is being written. After an ACKNOWLEDGE message is received in step 648, operation proceeds to step 650, where it is determined whether a failure of the test routine has occurred or not. If so, the UUT 100 either halts execution and provides a message indicating the failure or otherwise reports the failure in a step 652. After step 652, or if the test routine did not fail as determined in step 650, operation returns to step 624 to wait for the host computer 104 to initiate the next test routine.

A brief discussion of each of the test routines listed in Table II will now be described. It is understood, however, that the test procedures can perform whatever system level functional test is necessary for each of the individual elements of the UUT 100. Also, the particular details would depend upon the particular implementation of the UUT 100. The video subsystem test has already been briefly described. Next, an MATS memory test is performed on an external static RAM (not shown) of the keyboard controller 246, which performs address isolation and stuck bit tests. The next test is bit coupling and individual bit tests of the external static RAM. The next test is a CPU reset test which exercises the reset line of the microprocessor 202 and then establishes a dead man or watchdog timer to detect and recover from software hangs. In this manner, the microprocessor 202 periodically sends a reset command while it is looping through each of the test routines to reset a timer within the keyboard controller 246. If a predetermined time interval, which is preferably approximately ten seconds, elapses in any of the tests, then the keyboard controller 246 resets the microprocessor 202, which then examines the power on reset values stored in scratchpad registers to determine if an unexpected reset has resulted. If so, a message is sent to the host computer 104 to notify it of the unexpected reset. The next test is a keyboard E2PROM test, which verifies that the non-volatile password storage chip (not shown) associated with the keyboard controller 246 can be read and written.

The next test is a closed loop test providing a closed loop through the mouse connector 122, the keyboard connector 124 of the UUT 100 and the COM1 serial port 244a. After the UUT 100 indicates the keyboard port read test to the host computer 104, the host computer 104 asserts a predetermined bit pattern on the MCLK, MDATA, KCLK and KDATA signals of the mouse and keyboard connectors 122, 124 in a predetermined order, where the test routine executed by the UUT 100 verifies the proper signals and sequence of bits. The sequence of bits preferably emulates a binary counter. After each bit pattern is verified, the UUT 100 sends an OK message to the host computer 104, which then sends the next pattern until all of the patterns have been tested. If an error is found, the UUT 100 sends a report message to the host computer 104 and terminates the test routine. Then, a keyboard/mouse port write test is initiated, which is similar to the port read test except that the microprocessor 202 of the UUT 100 asserts the bit patterns on the signal lines of the keyboard connector 124 and mouse connector 122, which is verified by the host computer 104. A handshaking protocol through the COM1 serial port 244a verifies that each of the bit patterns are properly written to the keyboard and mouse connectors 124, 122.

The next test is a keyboard internal key scan and LED (light emitting diode) test, which is similar to the keyboard and mouse test described previously. However, this test preferably performs an interactive walking of 1's and 0's on the internal keyboard input and output scan lines. In particular, a 1 is asserted on one line and 0's on the remaining lines for each line, and then a 0 is asserted on one line and 1's the rest, which is referred to as a dataline test. The KBI (0:7) signals or the keyboard input scan lines are asserted by the host computer 104 and verified by the UUT 100. Furthermore, a keyboard output scanline test is performed for the signals KBO (0:10), for which patterns are set by the UUT 100 and verified by the host computer 104. Again, the UUT 100 and host computer 104 perform a handshaking protocol, so that each bit pattern is asserted and verified in a similar manner as described previously. Next, a keyboard LED test is performed for the Caps Lock, Scroll Lock, and Num Lock LED signals. Again, bit patterns are set by the UUT 100 and verified by the host computer 104.

A keyboard controller 246 to power supply 270 test is performed which verifies that a two-wire serial link between the keyboard controller 246 and the power supply 270 is functional by performing a dataline test for each internal memory location. Then, a power supply 270 to battery pack 114 communication test is performed to test the communications between the power supply 270 and the battery pack 114. For portable computers, a lid switch test is performed to identify open and close conditions, where bit patterns are set by host computer 104 and verified by the UUT 100. An embedded diagnostics switch test is performed for testing whether it can be detected if both of the buttons on a track ball or other input device of a portable computer are simultaneously pressed. Also, the power LED is tested for on and off switching capability. Furthermore, a power planes test is performed by cycling on and off the system board power planes and power down capable devices and that these components provide the proper response.

A component register test is performed for various registers, including registers within the ISP 228 associated with each of its various functions, including the timers 230, the PIC 232 and the DMA controller 234. Also, registers associated with the FDD controller 248, the HDD controller 256, the dual serial port device 244, the RTC 242, the parallel port 250, the memory controller 212 and the PCIC 260. Dataline tests are performed for each of the registers. During all of these tests, any reserved bits or bits which cannot be changed during operation are masked and are not altered. All initial values for the registers are saved and restored after the test is complete.

A programmable interrupt controller test verifies the functionality of two 8259 compatible programmable interrupt controllers within the PIC 232. A timer test verifies the functionality of 8254-compatible programmable interval timers within the timers 230. This test verifies the counter read operations for timer channels 0 through 2 and verifies the operation of timers 0 through 2 in various modes. Once the operation of the timer channels 0 through 2 has been verified, this test initiates communication with the host computer 104 via the COM1 serial port 244a in order to test the timer frequency. Timer frequency testing is accomplished by the UUT 100, which configures the speaker or timer channel 2 for various frequencies. The communications are initiated by the UUT 100 which sends a timer test message to the host computer 104 indicating that the timer test is initiated. The UUT 100 then configures the speaker for the first frequency, enables the speaker output and sends an OK message to the host computer 104. The host computer 104 measures the frequency and responds with an OK message. The UUT 100 then reconfigures for a new frequency and the process is repeated for as many frequencies as desired.

An RTC versus Timer test measures the RTC 240 against the timers 230. In this manner, an oscillator of the RTC 240 is compared against an oscillator of the timers 230. Then an RTC test is performed which verifies the functionality of different components of the RTC 240. This test verifies that the update in progress bit is toggled at one second intervals, verifies that second counter updates are taking place at one second intervals, verifies the operation of the set bit and verifies operation of an alarm function. Floating point unit tests are then performed to exercise the numeric coprocessor 208. This routine performs several sub-tests, including an existence/reset value test, stack/tags test, register dataline test on each of the internal registers of the coprocessor 206, data type conversions test, internal constants test, comparisons test, unmasked and masked exceptions tests, scaling/ extraction tests and trigonometric tests.

The dual serial port device 244 is then tested to verify functionality. This is a closed loop test where the host computer 104 is involved. In general, both of the COM1 and COM2 serial ports 244a, 244b will be used where one is being tested while the other is used as a synchronization port. The synchronization port is preferably set with the same baud rate, data bits and stop bits as is used during the driver and host communication in the test loop. It is noted that since the COM1 serial port 244a has already been used for communications with the host computer 104, it has already been tested with certain limited functionality of the CTS/RTS and SIN/SOUT signals. Therefore, the COM2 serial port 244b is the initial port tested while the COM1 serial port 244a serves as the synchronization port.

The first test performed for serial communications is an internal loop back test, which is used to verify the internal operation of a universal asynchronous receiver transmitter (UART) including register data lines and internal signal routing. Then a control input lines test is used to verify that the input lines to the test UART are operational. In this test, the host computer 104 toggles the input control lines of the UUT 100 in a predetermined order. The test begins with the UUT 100 sending a control input lines test message to the host computer 104 via the synchronization port. The host computer 104 then sets a first bit pattern onto the serial port being tested and responds with an OK message on the synchronization port. The UUT 100 verifies the settings and responds by sending an OK message to the host computer 104. If an error is found, the UUT 100 sends a TEST COMPLETED message to complete the particular test routine. For the control input lines test, DCD, RI, DSR, and CTS signals are tested. Then, the control output lines test is performed in a similar manner, where the UUT 100 toggles the output control lines of the UART under test in a particular order, which is verified by the host computer 104. If an error is found, the host computer 104 sends a TEST COMPLETED message to the UUT 100 and the test routine is terminated. For this test, the RTS and DTR signals are tested. Data transmission and receive tests are then performed to verify the transmission and receive capability of the UARTS at various baud rates. Preferably, the UUT 100 configures the serial port being tested for several baud rates, including baud rates of 300, 2400, 9600 and 19200 bits per second (bps). For the transmission tests, the UUT 100 sends data bytes 0-FFh as quickly as the port is able to handle and then waits for the host computer 104 to respond. Similarly, during the receive test the host computer 104 sends data bytes as quickly as the port under test can accept them and then sends an OK message to the UUT 100, where the UUT 100 then responds with a test result.

A parallel port test is then performed to verify the functionality of the parallel port 250. This test communicates directly with the host computer 104 via the COM1 serial port 244a and the parallel port 250 through the LPT1 connector 126 in order to coordinate the test sequence. The control lines STB*, AFD*, INIT* and SLIN* are tested using test bit patterns in a similar manner as described previously. A status port test is executed where the UUT 100 sends a status port test message to the host computer 104, which writes bit patterns to the control port and sends an OK message to the UUT 100. The UUT 100 then reads the status port to verify that the data is correct and sends an OK message back to the host computer 104. This test is performed for each of the status lines including BUSY, ACK*, PE, SLCT and ERR*. Then the UUT 100 performs an interrupt test and configures the parallel port 250 for the interrupt request signal IRQ5, installs an interrupt service routine, and then sends an interrupt test message to the host computer 104 indicating that the UUT 100 is ready to test the parallel port 250 interrupt capability. Finally, a data port transmission test is executed where the UUT 100 writes a first data pattern and then strobes the host computer 104 after the pattern is written. The host computer 104 reads the data, compares it to an expected value and responds with an ACKNOWL-EDGE message by toggling the strobe signal indicating that it is ready for the next data pattern. Operation proceeds in this manner until all patterns are sent and received.

The next test to be performed is an RGB, Hsync and Vsync line test to verify the functionality of the video signals. This is accomplished by having the UUT 100 drive the R, G and B lines with various patterns while the host computer 104 samples and verifies the patterns. Handshaking communication is used where the UUT 100 drives the pattern and sends an OK message and where the host computer 104 receives and verifies the pattern asserted and also responds with an OK message indicating that the host computer 104 is ready for the next pattern. After the RGB line test, an Hsync and Vsync line test is run in order to test the polarity of the Hsync and Vsync lines. Again, the UUT 100 drives the Hsync and Vsync signals in various patterns of polarity while the host computer 104 samples and verifies the patterns in a similar manner as described previously. The next test is a flat panel mode test which programs the video controller 216 into several modes required to exercise all of the lines.

If a docking port and corresponding connector 120 are provided, a docking port test is performed. A series of tests are then performed to test the cache controller 204 and the cache memory 206. Then, a series of tests are performed to test the memory controller 212 and the main memory 214. A series of floppy disk drive tests are then performed, which are designed to primarily verify the operation of the FDD controller 248, but also reads and identifies a boot sector from the FDD 112, if so connected. Next, a series of tests are performed for the HDD 110 and to verify the operation of the HDD controller 256. These tests include a controller presence test, an identify drive command test and a drive diagnostic test.

The last routine to be executed is a BIOS flash utility for testing the system ROM 240. This utility preferably communicates with the host computer 104 to determine whether or not the code within the system ROM 240 of the UUT 100 should be updated. In general, the UUT 100 reads the latest image from the FDD 112 into main memory 214, and then runs a CRC check image and reflashes the system ROM 242 and then executes a CRC check on the image in the system ROM 240. The UUT 100 then sends a TEST COMPLETED message to the host computer 104 to indicate that the BIOS flash utility has been completed. If either of the CRC checks fail or if the reflashing fails in any way, the UUT 100 will fail and this is communicated to the host computer 104 via the driver code loop communications protocol.

It can now be appreciated that a test apparatus and procedure according to the present invention provides full functional test of a computer system at the system level through one or more I/O ports without having to disassemble the computer. A test system and host computer are connected to several or all of the externally available I/O ports of the computer under test. A jumper is installed which activates circuitry to disable the internal system ROM of the computer, and also to bypass the PCMCIA controller if the PCMCIA connecter is used to access the expansion port. The computer under test is booted from diagnostic test code stored in memory on the test system. In this manner, the test method of the present invention is independent of, and does not rely on, the BIOS or DOS of the computer.

All of the remaining test routines can be executed remotely from the test system according to one embodiment. However, in another embodiment after certain initial tests are performed, a main driver loop code is downloaded into video RAM and the remaining test routines are executed by the microprocessor of the computer under test. Each of the test routines are downloaded from the diagnostic code in the memory of the test system and executed one at a time. A communication protocol is preferably established between the host computer and the computer under test so that the host computer controls initiation and also monitors the results of each test routine.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A test apparatus for testing operations of a computer system, comprising:

a test circuit, comprising:

memory for storing diagnostic code; and an I/O port coupled to said memory; and a computer system under test, comprising:

an I/O bus;
a PCMCIA port including a PCMCIA controller coupled to said I/O bus and an external PCMCIA connector coupled to said PCMCIA controller and for coupling to said I/O port of said test circuit;
an external disable mechanism that provides a disable signal;
a bypass circuit that receives said disable signal and correspondingly bypasses said PCMCIA controller to couple signal lines of said I/O bus to said PCMCIA connector; and
a processor coupled to said I/O bus, wherein said processor boots from said test circuit memory through said PCMCIA port and said test circuit I/O port upon power up and executes said diagnostic code.

2. The test apparatus of claim 1, wherein said computer system under test further includes:
a system ROM coupled to said I/O bus; and
a disable circuit that receives said disable signal and correspondingly disables said system ROM.

3. The test apparatus of claim 2, wherein said disable circuit further provides an enable signal to said I/O port of said test circuit via said PCMCIA port of said computer system under test, wherein said enable signal is received by said test circuit to enable said memory of said test circuit.

4. The test apparatus of claim 3, further comprising:
said disable mechanism including a jumper for providing an external boot signal; and
an enable circuit receiving said external boot signal for providing said enable signal to said PCMCIA port of said computer system under test.

5. The test apparatus of claim 1, wherein said I/O bus comprises an industry standard architecture (ISA) bus.

6. The test apparatus of claim 1, further comprising:
said I/O bus including address and data signal lines; and
said bypass circuit including an address buffer for coupling said address signal lines of said I/O bus to corresponding address pins of said PCMCIA connector and an enable circuit that enables said address buffer.

7. The test apparatus of claim 6, wherein said bypass circuit further comprises:
a data transceiver for coupling said data signal lines of said I/O bus to corresponding data pins of said PCMCIA connector; and
said enable circuit further enabling said data transceiver.

8. The test apparatus of claim 1, wherein said test circuit comprises:
a second I/O port; and
a host computer coupled to said second I/O port of said test circuit.

9. The test apparatus of claim 8, wherein:
said host computer downloads said diagnostic code to said memory of said test circuit;
said computer system under test further generates test result code and transfers said test result code to said memory of said test circuit; and
wherein said host computer retrieves said test result code from said memory to monitor said computer system under test.

10. The test apparatus of claim 8, further comprising:
said test circuit including a communication port;
said computer system under test further including a communication port for coupling to said communication port of said test circuit; and
wherein said host computer communicates with said computer system under test through said communication port of said test circuit.

11. The test apparatus of claim 10, further comprising:
a handshaking protocol between said host computer and said computer system under test for sending messages back and forth to initiate and acknowledge a series of test routines performed by said computer system under test.

12. The test apparatus of claim 11, wherein said messages include a run next test message, an acknowledge message acknowledging receipt of said run next test message, a test starting message, a test complete message and an all complete message indicating all of said series of test routines have been performed.

13. The test apparatus of claim 10, further comprising:
said computer system under test further including an I/O port;
said test circuit further including a third I/O port for coupling to said I/O port of said computer system under test; and
wherein said diagnostic code instructs said processor to perform a closed loop test on said I/O port of said computer system under test, said closed loop test including:
an output test, wherein said processor writes at least one output bit pattern to said I/O port and wherein said host computer reads and verifies said output bit pattern by comparing with a predetermined output bit pattern; and
an input test, wherein said host computer writes at least one input bit pattern to said third I/O port of said test circuit and wherein said computer system under test reads and verifies said input bit pattern by comparing with a predetermined input bit pattern.

14. The test apparatus of claim 13, wherein said input and output tests are dataline tests including a plurality of bit patterns.

15. The test apparatus of claim 13, wherein said I/O port of said computer system under test comprises a keyboard port.

16. The test apparatus of claim 13, wherein said I/O port of said computer system under test comprises a mouse port.

17. The test apparatus of claim 13, wherein said I/O port of said computer system under test comprises a serial communications port.

18. The test apparatus of claim 13, wherein said I/O port of said computer system under test comprises a parallel port.

19. The test apparatus of claim 13, wherein said I/O port of said computer system under test comprises a video port.

20. The test apparatus of claim 1, further comprising:
said computer system under test further including:
a serial port and a serial connector;
a parallel port and a parallel connector;
a keyboard port and a keyboard connector;
a mouse port and a mouse connector;
a video port and a video connector; and
said test circuit further including:
a serial port and a serial connector for connecting to said serial connector of said computer system under test;
a parallel port and a parallel connector for connecting to said serial connector of said computer system under test;
a keyboard port and a keyboard connector for connecting to said serial connector of said computer system under test;

a mouse port and a mouse connector for connecting to said serial connector of said computer system under test; and a video port and a video connector for connecting to said serial connector of said computer system under test.

21. The test apparatus of claim 1, further comprising:

said computer system under test further including memory coupled to said I/O bus, wherein said processor downloads driver code from said diagnostic code into said memory of said computer system under test and executes said driver code.

22. The test apparatus of claim 21, wherein said driver code instructs said processor to sequentially perform a series of test routines, wherein each one of said series of test routines are downloaded into said memory of said computer system under test and executed by said processor.

23. The test apparatus of claim 21, wherein said memory of said computer system under test comprises video memory.

24. A method of testing the functionality of a computer system having an I/O bus, a PCMCIA port including a PCMCIA controller and an external PCMCIA connector, a system ROM and a processor, comprising the steps of:

connecting memory of an external device to the PCMCIA connector of the computer system, wherein the memory of the external device includes diagnostic test code for booting and testing the computer system;

bypassing the PCMCIA controller of the computer system and coupling signal lines of the I/O bus to the PCMCIA connector; and booting the processor from the diagnostic test code in the external memory, where the processor executes the diagnostic test code in the external device to test the functionality of the computer system.

25. The method of claim 24, wherein the computer system includes an internal system ROM, after said step of connecting an external device, further comprising the steps of:

disabling the internal system ROM; and enabling the memory of the external device.

26. The method of claim 24, further comprising the steps of:

the diagnostic test code executing at least one test routine; and the test routine generating test result code indicating the results of the test routine.

27. The method of claim 24, wherein the external device and the computer system each include at least one communication port, further comprising the steps of:

connecting the communication ports of the external device and computer system together to establish a communication connection; and establishing a handshaking communication protocol between the external device and the computer system across the communication connection.

28. The method of claim 27, further comprising the steps of:

the microprocessor executing a plurality of test routines as instructed by the diagnostic test code;

the external device sending a start message on said communication connection indicating to the computer system to start each of the plurality of test routines; and the computer sending an acknowledge message on the communication connection indicating receipt of the start message.

29. The method of claim 28, wherein the computer system includes an I/O port, further comprising the steps of:

the external device writing a predetermined bit pattern to the I/O port during a test routine; and the computer system receiving the bit pattern and sending the external device a status message indicating the result of the test routine.

30. The method of claim 28, wherein the computer system includes an I/O port, further comprising the steps of:

the computer system writing a predetermined bit pattern to the I/O port during a test routine; and the external device receiving the bit pattern and sending the computer system a status message indicating the result of the test routine.

31. The method of claim 24, wherein the computer system includes memory, and wherein said executing step comprises the steps of:

transferring a driver code into the memory of the computer system; and the microprocessor executing the driver code.

32. The method of claim 31, further comprising the steps of:

the microprocessor executing a plurality of test routines as instructed by the driver code, wherein the driver code identifies the next test routine to be performed;

downloading the next test routine to be performed from the memory of the external device to the memory of the computer system; and executing the next test routine.

33. The method of claim 32, wherein the external device and the computer system each include a communication port, further comprising the steps of:

establishing a handshaking communication protocol between the external device and the computer system across the communication ports;

the external device sending a run next test message across the communication ports; and the computer system receiving the run next test message, responding with an acknowledge message and then executing the next test routine.

34. A method of testing a computer system through its externally available PCMCIA port, wherein the computer system includes a system ROM, a processor and an I/O bus and wherein the PCMCIA port includes a controller and a connector electrically coupled to the I/O bus, comprising the steps of:

connecting an external device having memory for storing diagnostic code to the externally available PCMCIA connector of the computer system, wherein the memory of the external device is coupled to the I/O bus of the computer system;

disabling the system ROM of the computer system;

enabling the memory of the external device;

bypassing the controller of the PCMCIA port and coupling signal lines of the I/O bus to the PCMCIA connector;

booting the computer system from the diagnostic code stored in the memory of the external device; and the diagnostic code instructing the processor of the computer system to test the functionality of the computer system through the PCMCIA connector electrically coupled to the I/O bus.

35. The method of claim 34, wherein the computer system includes memory, further comprising the steps of:

downloading a test driver code from the diagnostic code into the memory of the computer system; and executing the test driver code.

36. The method of claim 35, further comprising the step of:

the test driver code executing a plurality of test routines, each for testing a separate functional aspect of the computer system.

* * * * *